May 5, 1936.  B. G. OLVING  2,039,340
ELECTRIC CONDENSER CONSTRUCTION
Filed April 7, 1933    3 Sheets-Sheet 3

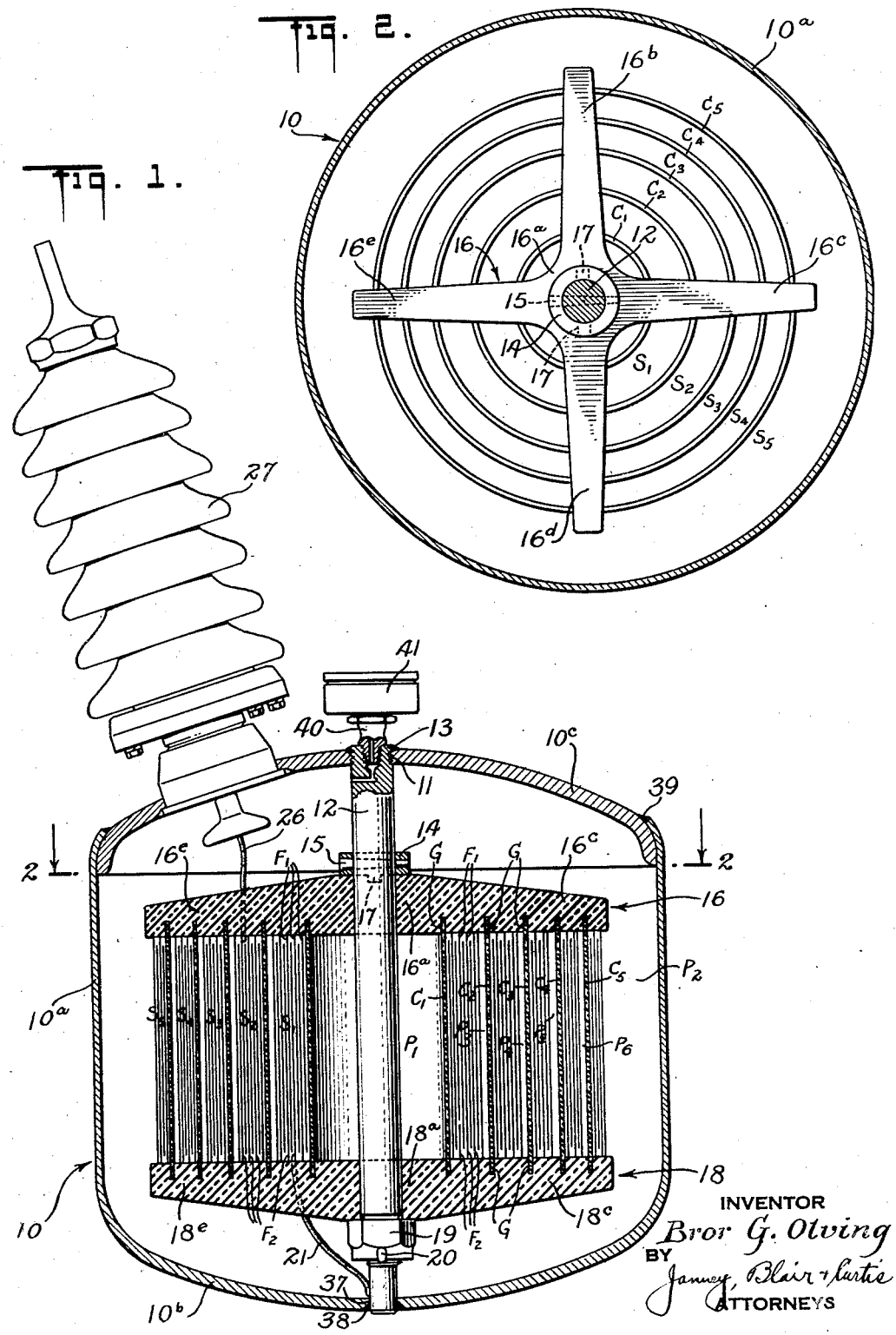

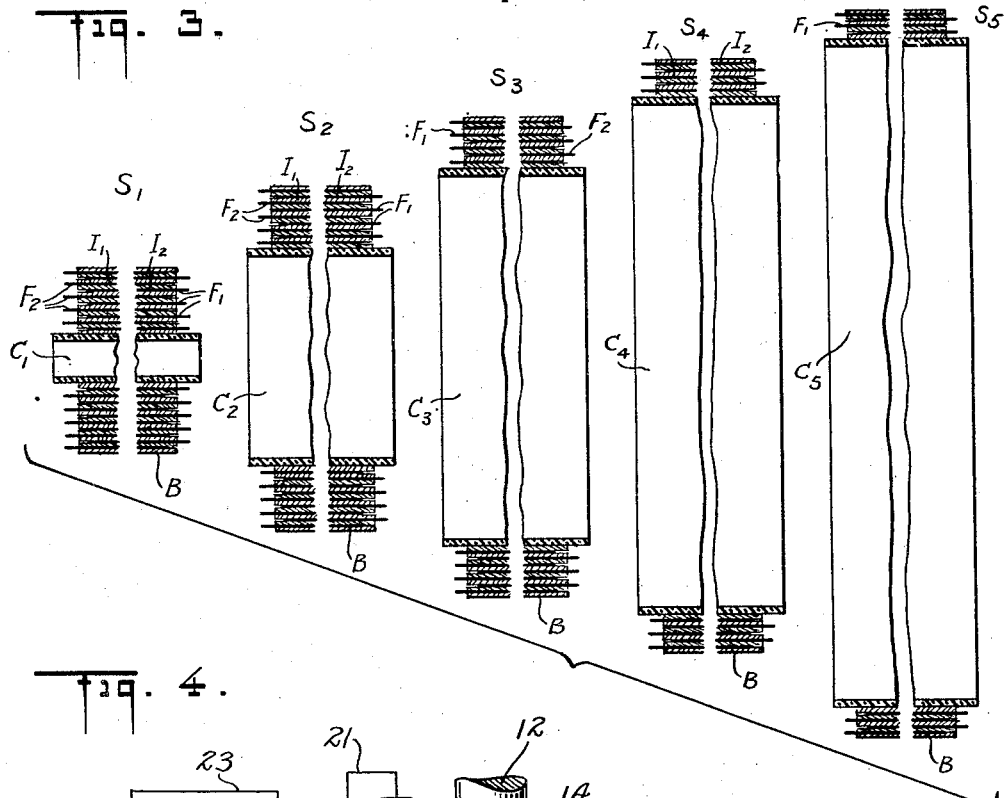

INVENTOR
Bror G. Olving
BY
Janney, Blair & Curtis
ATTORNEYS

Patented May 5, 1936

2,039,340

UNITED STATES PATENT OFFICE 2,039,340

ELECTRIC CONDENSER CONSTRUCTION

Bror G. Olving, Hamden, Conn., assignor to Products Protection Corporation, a corporation of Delaware Application April 7, 1933, Serial No. 664,844

13 Claims. (Cl. 175—41)

This invention relates to electric condenser construction and to a method of producing the same.

One of the objects of this invention is to provide a thoroughly practical, inexpensive and efficient electric condenser construction. Another object is to provide a condenser construction, adapted particularly for functioning on alternating current circuits and at high voltage in which heat dissipation will be effectively taken care of and the otherwise undesirable limiting effects of dielectric heat losses substantially negatived. Another object is to provide a condenser construction in which the space factor will be greatly improved and in which accordingly the k. v. a. capacity of the condenser per unit volume will be high. Another object is to provide a condenser construction of the above-mentioned nature which will be strong, compact, durable and reliable in action. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which is shown a preferred embodiment of the electrical features of my invention, Figure 1 is a vertical central sectional view through a completely assembled condenser;

Figure 2 is a horizontal sectional view as seen along the line 2—2 of Figure 1;

Figure 3 shows mainly schematically the individual condenser sections in one stage of their construction;

Figure 4 is a diagrammatic representation of the assembled condenser construction illustrating a possible method of interconnecting the various sections;

Similar reference characters refer to similar parts throughout the several views in the drawings.

Figure 5:
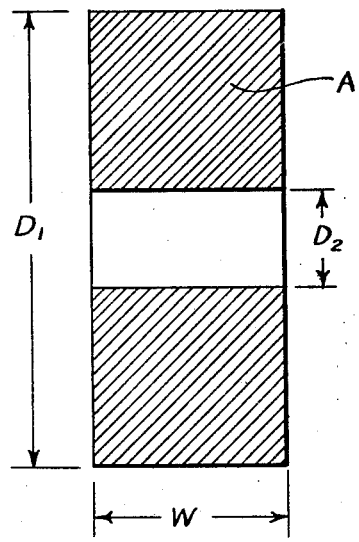
Figures 5 and 6 are comparative illustrative condenser constructions.

As conducive to a clearer understanding of certain features of my invention it may here be pointed out that, in the design and construction of electric condensers, particularly condensers which employ insulating tissue, as in foil condensers, impregnated with certain liquid impregnating materials, the dielectric losses in the insulating material become of such magnitude that it has heretofore been found difficult appropriately and efficiently to reconcile the factors of dielectric strength and of heat-dissipating surface with respect to such factors as the voltage and frequency and k. v. a. capacity per unit volume of the condenser. For example, where the condenser is employed in a direct current circuit, the total volume of the condenser is a function of the dielectric strength of the dielectric employed, the volume of dielectric required per k. v. a. being proportional to the square of the operating gradient. Where, however, the condenser is to function on an alternating current circuit, the dielectric losses become an important factor and the volume of dielectric employed may be said to be a function of both the dielectric strength and of the dielectric loss. The dielectric losses are, of course, in turn a function of the frequency. The dielectric loss, particularly with the use of certain dielectric material such as condenser tissue impregnated with liquid impregnating materials, becomes of such magnitude that the resultant or required heat-dissipating surface determines the physical dimensions of the condenser and hence full advantage cannot be taken of the dielectric strength of the dielectrics employed.

One of the dominant aims of this invention is to provide a condenser construction in which appropriate heat dissipation and hence dissipation of the dielectric losses are dependably achieved while at the same time achieving high k. v. a. capacity per unit volume and effective insulation without sacrifice of the advantages of the dielectric strength of the dielectric employed.

Referring first to Figures 1 and 2, I have shown a casing 10 of any suitable construction, together with a suitable insulating medium. By way of illustration, the casing 10 may consist of a cylindrical pressed steel casing or tank in which the side walls 10$^a$ and the bottom 10$^b$ are preferably formed integrally with one another, the closure 10$^c$ being applied as described hereinafter. Inasmuch as I have elected to illustrate the electrical features of my invention in coaction with a dielectric medium that is in the form of a gas, such as nitrogen, for example, under a pressure on the order of 15 atmospheres, I prefer to employ the casing construction just mentioned inasmuch as that casing construction is well adapted to withstand such heavy internal pressures.

The central portion of the closure 10$^c$ is provided with a threaded opening 11 to receive a supporting rod 12 preferably of steel, the parts being so related that when the closure 10c is in closing position, the rod 12 is substantially coaxial with the axis of the casing 10. Preferably the rod 12 is welded to the closure 10c as at 13 in order to insure air-tightness.

Adjacent its upper end, as viewed in Figure 1, the supporting rod 12 carries a collar 14 pinned thereto as by the tapered pin 15 and abutting against the collar, is a spider-like support generally indicated at 16, preferably made of a suitable insulating material such as bakelite. The spider 16 has a central collar-like portion 16a which abuts against the collar 14 on the rod 12, these two parts being shaped in any suitable way as is indicated at 17 to prevent rotation of the spider 16 relative to the collar 14 and hence relative to the casing itself.

Extending radially from the collar portion 16a is a suitable number of supporting arms, illustratively four in number, and they are better shown in plan in Figure 2 at 16b, 16c, 16d and 16e. These arms are given any suitable cross-section adapted to give them substantial rigidity or resistance to bending out of their common plane.

At the lower end, as seen in Figure 1, the supporting rod 12 carries a somewhat similar spider member generally indicated at 18; the latter is also provided with a central collar-like portion 18a which is slidably received on the rod 12 and it has also radially extending arms, preferably four in number, similar to the arms of the spider 16; in Figure 1 two of these arms are shown in cross-section at 18c and 18e.

Between the arms of the spider-like frames 16 and 18, my condenser construction is adapted to be supported in a manner more clearly described later; the condenser construction, made up of a plurality of sections, is virtually clamped between the frames 16 and 18, a nut 19 threaded onto the lower end of the rod 12 coacting with the latter to draw the frames 16 and 18 toward each other and thus securely hold the condenser sections in place. The nut 19 may be locked by any suitable means, such as a cotter pin 20.

By way of illustration my condenser construction is made up of concentric annular sections, illustratively five in number; they are indicated in Figure 1 at $S_1$, $S_2$, $S_3$, $S_4$ and $S_5$. And to illustrate certain features of my invention, let it be assumed that the electrostatic capacity or the k. v. a. rating of these sections are the same and let it be further assumed that the sections are to be connected in series. Illustratively, the condenser may be intended to function at 22,000 volts on a 60-cycle alternating current circuit.

The condenser sections are preferably made by spirally winding two foil strips and two strips of insulating material, alternated with each other, the insulation strips having their edges alined while the foil strips are staggered with respect to each other, one foil strip projecting to one side beyond the adjacent alined edges of the insulation strips and the other foil strip projecting beyond the alined adjacent edges of the insulation strips on the other side; these relations of these parts are clearly indicated in Figure 3 with respect to each of the various coil sections, the foil strips being indicated at $F_1$ and $F_2$ and the insulating strips being indicated at $I_1$ and $I_2$. The insulating strips may be made up of condenser tissue which may be impregnated with any suitable liquid or solid dielectric impregnating material or materials.

The various condenser sections are wound upon suitable cores, shown in Figure 3 at $C_1$, $C_2$, $C_3$, $C_4$ and $C_5$; these cores are of an axial dimension somewhat greater than the over-all axial dimension of the wound foil and paper strips and hollow cores are of progressively increasing diameters. In order to achieve equality of electrostatic capacity throughout all of the condenser sections, the number of turns of alternated foil strips and insulation strips progressively diminishes as the inside diameter of the annular condenser sections, as determined by the outside diameters of their respective cores, increases. The number of turns, in order to achieve this equality, is proportional to the inside diameter of the condenser section except as later noted.

The cores $C_1$, $C_2$, etc., are preferably in the form of relatively thin-walled tubing and they may be made entirely of solid dielectric material or of metal. If made of solid dielectric material, the alternated foil and insulating strips may be wound directly upon the cores but if made of metal, a suitable layer of insulating material is first applied to the outside surface of the tubular metal cores and then the winding may be proceeded with.

When the winding of each condenser section on its core has been completed, the windings of each coil section are held against unwinding by any suitable means, such as, for example, by taping the outer periphery thereof, or winding a suitable number of turns of sheet dielectric about the outer periphery or by applying thereto a suitable tube-like dielectric sleeve; this outer binding insulating material or member is shown in Figure 3 at B.

The various sections, thus constructed, are, furthermore, so proportioned, as appears clearly from Figures 1 and 3, that when they are arranged one within the other so that their axes coincide, there is provided an annular space between the outer cylindrical surface of one section and the inner cylindrical surface of the core of the next larger section. Thus arranged, the various sections are held in this relation and in these relative positions by the arms of the spider frames 16 and 18, the arms being provided with suitable grooves G (see Figure 1) suitably spaced in a radial direction in which are received the projecting end portions of the cores $C_1$, $C_2$, $C_3$, etc.

The condenser units thus related to the two spider frames 16 and 18, are thereupon slipped onto the supporting rod 12 (Figure 1), the nut 19 being tightened up so as to suitably clamp the cylindrical cores between the arms of the spider-like frames 16 and 18.

Before or after this assembly of the sections with respect to the support 12, the sections may be electrically interconnected in any suitable manner as may be necessary or required by the particular electrical conditions to be met with in practice. For example, the sections may be connected in series and when they are thus to be electrically inter-related, I prefer to employ electrical interconnections such as are shown in Figure 4.

Turning now to Figure 4, one terminal or electrode of the innermost section $S_1$ is grounded to the frame or casing as by the conductor 21 which, as is better shown in Figure 1, may be grounded directly to the rod support 12. A suitable conductor 22 (Figure 4) connects the other terminal of section $S_1$ to one terminal of the outermost section $S_5$, the remaining terminal or electrode of which is connected by a conductor 23 to one terminal of the next innermost section $S_2$; the remaining terminal of section $S_2$ is connected by conductor 24 to one terminal of the next outermost section S₄, the remaining terminal of which is connected by conductor 25 to one terminal of the middle section S₃; the remaining terminal of section S₃ is connected by conductor 26 to a high voltage terminal bushing 27 (Figure 1) which carries the conductor through the wall of the closure member 10ᶜ, the insulating terminal construction 27 being of any suitable design or construction.

The closure member 10ᶜ, thus carrying the terminal bushing and the condenser, is now related to the casing 10, the lower end of the rod 12 being received in an opening 37 in the bottom 10ᵇ so that the rod 12 finds itself supported at its ends by the bottom and closing walls 10ᵇ and 10ᶜ of the container. The lower end of the rod 12 is preferably welded about the periphery of the opening 37 and to the bottom 10ᵇ, as is indicated at 38, thus to make a dependable air-tight joint. The closure member 10ᶜ may now be secured in place. The closure 10ᶜ is preferably dimensioned to be received within the open end of the cylindrical side walls 10ᵃ of the container, whereupon the upper edge portions of the latter are hammered or bent over as at 10ᵈ (Figure 1) and then welded as at 39 to make a hermetic seal or joint.

The insulating and cooling medium may thereupon be placed in the container and where that takes the form of a gas under pressure, it may be injected through a nipple 40 threaded into the upper end of the supporting rod 12, the parts being provided with suitable channels or passages opening into the interior of the sealed casing; the parts may also be so constructed that the nipple 40 supports a gage 41 to indicate the pressure of the gas within the container.

Referring now again to Figure 1, the assembly thus achieved will be seen to provide a central annular passage P₁ and an outer annular passage P₂ while intervening the successive concentrically arranged sections are annular passages P₃, P₄, P₅ and P₆; all of these passages will be seen to be connected with each other at both their upper and lower ends. Whatever the dielectric cooling medium employed, whether gas under pressure or otherwise, there is thus provided adequate and efficient circulation thereof into thermal contact with the condenser sections, thus to withdraw the heat from the latter and to dissipate the heat to the walls of the casing 10 for radiation or other withdrawal therefrom. The heat losses in the condenser sections are transferred to the dielectric cooling medium, for example, the gas under pressure, that is present in the passages P₁, P₃, P₄, P₅ and P₆; the medium thus becoming heated rises (as viewed in Figure 1), thus causing it to flow into contact with the upper wall 10ᶜ of the casing and thus causing the fluid medium to flow downwardly in the passage P₂ where it further gives up heat to the side walls 10ᵃ of the casing; continuing its circulating path, it moves downwardly and thence inwardly in a radial direction, in contact with the bottom wall 10ᵇ of the casing to which it gives up further heat, whence it is ready to enter the lower ends of the passages P₁, P₃, P₄, P₅ and P₆ in a cooled condition, thus to repeat the above-described path of flow and heat abstracting and dissipating action.

In this connection, it is important to note that, by the structural features above described, I am enabled to take full advantage of the dielectric strength of the dielectrics employed, whether they be in the form of the insulation strips which are alternated with the foil plates of the condenser sections or in the form of the cylindrical core members C₁, C₂, etc.; as the inside and outside diameters of the successive sections increase, the heat-dissipating surfaces thus furnished the sections increase. Assuming the sections to be of the same k. v. a. rating, and assuming that the innermost section S₁ is initially dimensioned as to outside and inside diameters to provide an appropriate heat-dissipating surface to take care of the heat losses such as the dielectric losses, the heat-dissipating surface per k. v. a. of the remaining and successively larger-diametered sections increases with increase in the inside diameter thereof. Thus, I am enabled to increase the electrical operating gradient of these outer or successively larger-diametered sections, thereby correspondingly decreasing the amount of solid dielectric material that need be employed, with the result that the volume of solid dielectric required per k. v. a. decreases as the inside diameter of the sections increases. The effect of this important result is far-reaching. For example, I am enabled to utilize the full efficiency of the solid dielectric material employed and, contrary to heretofore known practice, I am enabled to determine the volume of solid dielectric material employed per k. v. a. by its dielectric strength and not by the heat losses of the dielectric. Stated differently, where prior practice has to depend upon the necessary guide or rule that the volume of solid dielectric is a function of both the dielectric strength and the dielectric loss in the dielectric employed, the volume of the solid dielectric employed is, in accordance with the features of my invention, determined by only the one factor, namely, the dielectric strength of the dielectric employed.

These important considerations further make it possible to achieve an unusually good space factor, resulting in a small volume per k. v. a. The amount of solid dielectric material employed is greatly reduced and where condenser tissue and an impregnating material are employed, the amount of both is materially reduced and this reduction is of very substantial importance because of the relatively very expensive impregnating materials that sometimes must be employed to achieve certain results.

Figure 6:
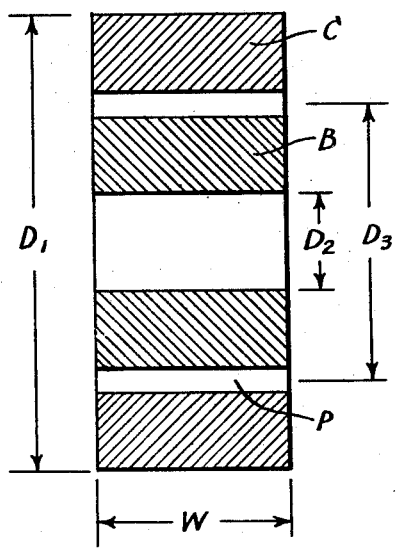

In view of the foregoing, I believe the practice of my invention will be clear but as conducive to a clearer understanding and a more ready appreciation of various features of my invention, it may be helpful to consider certain illustrative comparative constructions; hence, reference might now be made to Figures 5 and 6, Figure 6 indicating diagrammatically certain aspects of my invention as compared to Figure 5 which may be considered as illustrative of prior practice.

In Figure 5 I have shown diagrammatically and in vertical cross-section a condenser roll A made up of alternated foil and insulation strips rolled into a helix having an outside diameter D₁, an inside diameter D₂, and a thickness or width in an axial direction W. Let it be assumed that the capacitor roll A of Figure 5 is intended to function at a voltage of 2300 volts and that it is designed and related so that the maximum safe operating temperature is reached at an operating gradient of 300 volts per mil. of thickness of insulation between adjacent foil strips or plates. Let it also be assumed that the dimensions D₁, D₂ and W are, respectively, 10″, 4″ and 10″. Such a condenser roll will be found to have the following characteristics:—

Volume occupied by dielectric__ 660 cubic inches

Total weight of dielectric_____ 66 lbs.
Total rating of coil at a gradient of 300
    volts per mil_____ 22 k. v. a.
Power factor of dielectric at operating temperature_____ 0.3%
Total loss in roll $$\frac{22 \times 1000 \times 0.3}{100} = 66 \text{ watts}$$

Exposed surface (heat-dissipating area)—
    $= 126 + 314 + 66 + 66 = 572$ sq. in.

Average loss $= \frac{66}{572} = 0.115$ watts per sq. in.

Assuming that the fluid employed as a dielectric and cooling medium is able to remove or dissipate approximately 0.01 watt per square inch per degree C. rise in temperature, then the temperature difference between the roll A and the fluid is approximately 10° C.; taking into consideration the temperature difference between the fluid and the tank or casing and between the tank and the surrounding air or atmosphere, it may, for present purposes, be assumed that this is the maximum temperature rise to which the roll A may be subjected without danger of thermal breakdown.

Turning now to Figure 6, let it be assumed, for purposes of comparison, that, in accordance with certain features of my invention, the roll A of Figure 5 has been subdivided into two concentric rolls of equal volume, namely, rolls B and C (Figure 6). The dimensions $D_1$, $D_2$ and W are again, respectively, 10", 4" and 10", and to simplify the computations let the dimension $D_3$ be 7.6", being square root of the mean value of the inside diameter and outside diameter squared, of rolls C and B, respectively, inasmuch as the radial thickness of the annular passage P between the rolls may be assumed to be relatively small. The following characteristics result:

Volume of roll B (one-half of
    roll A of Figure 5)_____ 330 cubic inches
Volume of roll C (one-half of
    roll A of Figure 5)_____ 330 cubic inches
Exposed area of roll B is $126 + 238 + 66$_ 430 sq. in.
Exposed area of roll C is $238 + 314 + 66$_ 618 sq. in.
Total exposed area of rolls B and C__ 1048 sq. in.

It will be noted that the total exposed area has thus been increased from 572 square inches for roll A of Figure 5 to 1048 square inches for the arrangement of Figure 6.

Allowing the same temperature rise (10° C.) in rolls B and C as in roll A, 0.115 watts can be dissipated per square inch and hence the total heat loss that can be dissipated from rolls B and C is $1048 \times 0.115$ or 120 watts, corresponding, therefore, to a total rating of 40 k. v. a. at a power factor of 0.3%.

It will be noted that the total rating has been increased from 22 k. v. a. for roll A of Figure 5 to 40 k. v. a. for the arrangement of Figure 6 in which, for illustration, the roll A of Figure 5 has been considered subdivided into only two concentric spaced sections. Assuming the amount of condenser tissue or insulation strip employed to be the same, the weight of insulation per k. v. a. has been decreased from $$\frac{66}{22} \text{ or 3 lbs. (for roll A) to}$$

$$\frac{66}{40} \text{ or 1.65 lbs.,}$$

thus illustrating, among other things, the greatly improved efficiency of use of condenser tissue or solid dielectric material.

If each roll B and C is to dissipate not more than 0.115 watts per square inch of exposed surface, and since the exposed areas of rolls B and C do not happen to be equal, roll B should not be rated at more than $$\frac{430}{1048} \times 40 \text{ or 16.4 k. v. a.}$$

and roll C should not be rated at more than $$\frac{680}{1048} \times 40 \text{ or 23.6 k. v. a.,}$$

the ratings thus being made directly proportional to the heat-dissipating areas.

Now, in accordance with certain features of my invention earlier above-mentioned, the rolls B and C are to be operated at different gradients, thus to load each of them to their respective maximum safe limits. Roll B of Figure 6, which contains half the volume of roll A of Figure 1, would carry a load of 11 k. v. a. (half of the rating of roll A) at a gradient of 300 volts per mil (the latter being the actual operating gradient of roll A); to allot to roll B a rating of 16.4 k. v. a. (as above arrived at), the operating gradient of roll B should be $$300 \sqrt{\frac{16.4}{11}}$$

or 366 volts per mil. Roll C, rated, as above arrived at, at 23.6 k. v. a. and also being half the volume of roll A, should therefore have an operating gradient of 300

$$\sqrt{\frac{23.6}{11}}$$

or 438 volts per mil. To provide these different operating gradients, different thicknesses of dielectric are employed. At 2300 volts, the thickness per layer (of strip or sheet insulation between the foil plates) in roll B at the operating gradient of 366 volts per mil is 6.3 mils and the thickness of dielectric per layer in roll C, at a gradient of 438 volts per mil is 5.25 mils. If condenser tissue of 0.4 mils thickness is employed, sixteen thicknesses or webs of condenser tissue are used per layer in roll B but only thirteen webs or thicknesses per layer in roll C. The electrostatic capacity of roll B is then 8.2 microfarads and that of roll C is 11.8 microfarads.

The above illustrative and comparative figures and data show certain of the unique advantages flowing from my invention and the specific instance above developed suffices where the capacities formed by the rolls B and C are to be connected in parallel.

Where the rolls are to be connected in series for 4600 volt service (instead of parallel as above mentioned for 2300 volt service), several specific or detailed steps may be taken in carrying out my invention. For example, still considering the illustrative and comparative structures of Figures 5 and 6, I may make the electrostatic capacities of the sections or rolls B and C equal (in order to avoid inverse distribution of voltage drops) and use a different dielectric layer thickness in each roll or by way of further example I may use the same thickness of dielectric layer in all the sections or in rolls B and C but proportion the electrostatic capacities of the rolls so that the terminal voltage across each roll provides the desired operating gradient in that roll.

To illustrate these illustrative embodiments of my invention, let the first above-mentioned of these be first considered. Where, as earlier above outlined, the capacities of rolls B and C were, respectively, 8.2 microfarads and 11.8 microfarads, the voltage of 4600, if applied to these two rolls connected in series, would divide between the sections or rolls inversely as their capacities and hence the voltage across roll B would be 2710 volts and the voltage across roll C would be 1890 volts and roll B would draw a load of 22.8 k. v. a. while roll C would draw a load of 14.7 k. v. a. However, by decreasing the number of turns in roll C so that its electrostatic capacity is reduced from 11.8 to 8.2 microfarads, thus making the capacities of the two rolls B and C equal, the two rolls, now connected in series, would cause the voltage to divide equally between them and the rating or load capacity of each roll becomes 16.4 k. v. a. The total rating thus becomes 32.8 k. v. a. Sixteen webs of 0.4 mils condenser tissue are used in roll B to make up a single layer of insulation between adjacent foil plates and thirteen webs to make up a single layer of solid dielectric insulation in roll C.

As compared to the condenser A of Figure 5, this series arrangement of rolls B and C, aside from achieving the above-mentioned advantages, achieves an increase in capacity or rating from 22 k. v. a. (condenser or roll A of Figure 5) to 32.8 k. v. a. while also actually achieving a substantial saving in materials employed, the saving in the latter connection being equivalent to the difference between 40 k. v. a. and 32.8 k. v. a. Actually the cost of material per k. v. a. has been reduced approximately 50%.

Considering now the second of the two above-mentioned arrangements for series connection, this may be of advantage under certain manufacturing conditions or circumstances where it may be desirable, as a manufacturing expedient, to maintain the same thickness of dielectric layer in both rolls or in the several sections.

In such case, considering first sections or rolls B and C of Figure 6 as compared with the roll A of Figure 5 and, as first above indicated by illustrative calculations, roll B may have a maximum of 16.4 k. v. a. and roll C a maximum rating of 23.6 k. v. a.; if these two sections are connected in series across a 4600 volt circuit, and it is desired to operate both rolls at their maximum rating, the electrostatic capacities of the two rolls B and C should be so proportioned that the voltage across roll B, in order to obtain 16.4 k. v. a., becomes 1890 volts, and the voltage across roll C, in order to obtain 23.6 k. v. a., becomes 2710 volts. As the voltage across two series-connected rolls divides between the sections inversely as their capacities, the electrostatic capacity of roll B, rated at 16.4 k. v. a. and 1890 volts, must be made approximately 12.4 microfarads, while the capacity of roll or section B, rated at 23.6 k. v. a. and 2710 volts, should be approximately 8.4 microfarads.

In order now to obtain a rating of 16.4 k. v. a. in roll B, the operating gradient, as earlier above calculated, is 366 volts per mil. The layer thickness of dielectric or of condenser tissue is then $$\frac{1890}{366}$$

or 5.17 mils, requiring therefore thirteen webs of 0.4 mils condenser tissue per layer of dielectric. Inasmuch as the same thickness of dielectric is to be used in roll C, the operating gradient in roll C is then $$\frac{2710}{5.17}$$

or approximately 525 volts per mil.

Inasmuch as it has been assumed, in the foregoing, that the impregnated tissue or dielectric employed can withstand a stress of 600 volts per mil, provided the temperature does not rise above a safe limit, it will be seen that the operating gradient of 525 volts per mil above arrived at falls within this operating limit of the dielectric and that the roll C as illustratively calculated above is satisfactory.

The above several calculations and embodiments are to be understood as illustrative and are not to be interpreted in a limiting sense, being intended to possibly clarify certain features or aspects of my invention and to aid in arriving at a more ready understanding of certain aspects of my invention. Moreover, the comparative figures above given indicate various of the many thoroughly practical advantages that flow from my invention; by sub-division beyond the illustrative two sections of Figures 6, these advantages are multiplied.

In order further to clarify certain aspects of my invention, it might be noted that, particularly with electrostatic condensers whose dielectric is impregnated with liquid hydrocarbons, such as oil, and the like, the dielectric loss or power factor varies with the operating temperature, increasing relatively rapidly as the operating temperature increases above approximately 40° C. This characteristic is graphically indicated in Figure 7 by curve X in which the rise in temperature beyond about 40° C. will be seen to be relatively rapid.

This characteristic indicates and is in fact caused by cumulative effects inasmuch as the heat losses, increasing with the temperature, cause further rises in temperature and in turn cause further increases in the losses. Such action tends to give rise to the creation of so-called hot spots wherein thermal and ultimate electrical breakdown occurs.

Figure 7:
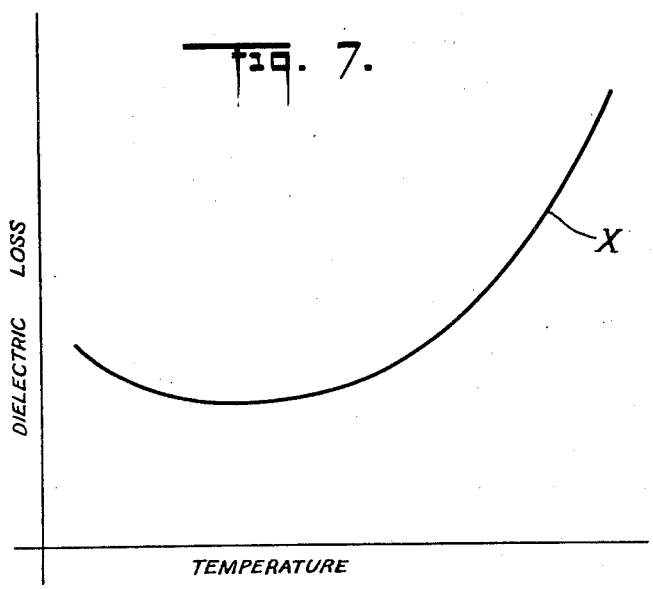
Figure 7 shows comparative operating graphs.

Even though fibrous materials impregnated with, for example, a liquid or semi-solid impregnating material, such as oil or the like, have high dielectric strength, it has heretofore not been possible efficiently or practicably to take advantage of its high dielectric strength since the k. v. a. rating (proportional to the square of the operating gradient) of the condenser is limited by the temperature rise, as will be clear in what has just been stated above in connection with the characteristic curve X of Figure 7.

However, by practicing my invention, I achieve not only the manifold and important practical advantages earlier above indicated but also, as will be clear particularly from Figure 1, I am enabled to provide such a large area of contact between each condenser section and the dielectric cooling medium that the rate of heat dissipation is sufficiently high to maintain the effective operating temperature at or relatively near the point of minimum dielectric loss on the curve X of Figure 7.

The axially projecting cores $C_1$, $C_2$ project beyond the sides of the condenser sections sufficiently to form suitable voltage barriers between the exposed or projecting foils of adjacent sections; they project to a large enough extent to prevent surface leakage or flash-over from one condenser section to another. Where, as in the preferred form, a gaseous dielectric under high pressure, is employed, the gaseous dielectric, of relatively high dielectric strength, permeates and enters into any pores in the solid dielectric material employed and improves the latter. The gaseous dielectric, furthermore, has a permittivity on the order of unity whereas the solid dielectric material such as that employed in the cores $C_1$ $C_2$, etc., when the latter are thus made, has a much higher permittivity, but these two dielectrics are in series between adjacent sections of the condenser and because of the distribution of the dielectric stress between adjacent sections inversely as the permittivities of these two serially related dielectrics, the annular space between adjacent sections may be made less and this factor may also be utilized to contribute toward achieving greater compactness and a better space factor.

The manner in which the condenser sections are interconnected when connected in series, as was above described in connection with Figure 4, also contributes toward improving the over-all space factor for the innermost and outermost sections are of relatively lowest voltage while the potential of the sections increases as the middle section or sections are approached; this mode of connection of the sections diminishes the potential difference between the outermost section and the walls of the casing and the spacing between these two parts may therefore be made less.

It will thus be seen that there has been provided in this invention a condenser construction and a method of achieving the same in which the various objects hereinbefore mentioned, together with many thoroughly practical advantages, are successfully achieved. It will be seen that the condenser is of high efficiency in that I am enabled to make highly efficient use of the dielectric strength of the solid dielectrics employed while maintaining correspondingly a minimum possible volume of such solid dielectrics, thus greatly reducing the dielectric losses which become evident in the form of heat. Moreover, it will be seen that I am enabled to achieve great economy in such matters as cost of production, while economy is also achieved by reason of the high ratio of k. v. a. capacity per unit volume. Thus, I am enabled to achieve a condenser construction well adapted to meet the varying conditions of hard practical use in alternating current circuits.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In condenser construction, in combination, a casing, a substantially centrally positioned vertical supporting member in said casing, a pair of spaced frame members carried by said supporting member, said frame members having a plurality of radially extending arms, a plurality of annular concentrically related condenser sections extending about said support and between said frames, the outside diameter of a smaller section being smaller than the inside diameter of the next adjacent section, thereby to provide an annular passage between adjacent sections, the over-all dimensions of said concentric sections as a whole being smaller than the inside dimensions of said casing, whereby said annular passages are in communication with the spaces above and below the condenser sections and with the space between the outermost condenser section and the inner wall of said casing, said arms engaging and holding said sections in concentric relation, and a dielectric cooling medium in said casing for circulation through said passages and said spaces.

2. In condenser construction, in combination, a casing, a substantially centrally positioned vertical supporting member in said casing, a pair of spaced frame members carried by said supporting member, said frame members having a plurality of radially extending arms, a plurality of annular concentrically arranged condenser sections about said support, the outside diameter of a smaller section being less than the inside diameter of the next larger section, each section having a central cylindrical core projecting beyond its ends and said arms having grooves for receiving the projecting portions of said cores, thereby to hold said sections in assembled relation, a dielectric cooling medium in said casing for circulation through the annular passages between adjacent sections, and means for drawing one of said frames with its arms toward the other frame and its arms, thereby to clamp said sections in position therebetween.

3. In condenser construction, in combination, a casing, a substantially centrally positioned vertical supporting member in said casing, a pair of spaced frame members carried by said supporting member, said frame members having a plurality of radially extending arms, a plurality of annular concentrically arranged condenser sections about said support, the outside diameter of a smaller section being less than the inside diameter of the next larger section, each section having a central cylindrical core projecting beyond its ends and said arms having grooves for receiving the projecting portions of said cores, thereby to hold said sections in assembled relation, a dielectric cooling medium in said casing for circulation through the annular passages between adjacent sections.

4. In condenser construction, in combination, a casing, a plurality of annular concentric condenser sections of progressively increasing inside and outside diameters proportioned so that there is an annular space between adjacent sections, each section comprising two foil strips and two dielectric strips alternated with each other and arranged spirally, the inside and outside diameters of said sections being so large that the exposed surfaces of the annular sections provide such large heat-dissipating surfaces that the factor determining the solid dielectric material employed in the sections is the dielectric strength of the dielectric material and not the heat losses in the dielectric at the frequency of operation of the condenser, and a fluid dielectric and cooling medium for circulation through said annular spaces and into contact with the casing.

5. In condenser construction, in combination, a casing, a plurality of annular concentric condenser sections of progressively increasing inside and outside diameters proportioned so that there is an annular space between adjacent sections, condenser sections progressively more remote from the innermost annular section having progressively greater heat-dissipating surfaces and progressively smaller quantities of solid dielectric material therein, and a fluid dielectric and cooling medium for circulation through said annular spaces and into contact with the casing.

6. In condenser construction, in combination, a casing, a plurality of annular concentric condenser sections of progressively increasing inside and outside diameters proportioned so that there is an annular space between adjacent sections, said sections comprising foil plate elements and sheet condenser tissue impregnated with a dielectric material alternated with the foil plates, the volume per k. v. a. of impregnated condenser tissue in said sections being progressively less from the innermost section to the outermost, and a fluid dielectric and cooling medium for circulation through said annular spaces and into contact with the casing.

7. In condenser construction, in combination, a casing, a plurality of annular-like condenser sections each of substantially the same capacity, said sections being arranged one about the other and substantially coaxially and being dimensioned to provide spaces between adjacent sections, means mechanically supporting said sections within said casing, means electrically connecting said sections in series so that a middle section is of substantially highest voltage and the outermost section that is closest to the casing walls is of relatively low voltage, and a fluid dielectric and cooling medium for circulation through the spaces between sections and into thermal contact with the walls of the casing.

8. In condenser construction, in combination, a casing, a plurality of annular-like condenser sections each of substantially the same capacity, said sections being arranged one about the other and substantially coaxially and being dimensioned to provide spaces between adjacent sections, a metallic supporting member within said casing, said condenser sections being arranged about said supporting member, the latter being dimensioned relative to the innermost section so that there is provided an annular space therebetween, means carried by said supporting member for holding said sections one about the other and to maintain the spaces between adjacent sections, a fluid dielectric and cooling medium for circulation through said spaces and said annular space and into heat-dissipating contact with the walls of said casing, and means electrically interconnecting said sections in series so that a section intermediate of the innermost and outermost sections is of highest potential and said innermost and outermost sections, adjacent respectively to said supporting member and the walls of said casing, are of relatively lowest voltages.

9. In condenser construction, in combination, a plurality of condenser sections having progressively larger heat-dissipating surfaces, each section being made up of plate members alternated with solid dielectric material, said sections being connected in parallel and the dielectric material in successive sections being proportioned so that the operating gradient of the sections is progressively greater.

10. In condenser construction, in combination, a plurality of condenser sections having progressively larger heat-dissipating surfaces and each made up of alternated plate members and dielectric material, and electrical connections for said sections, said sections being proportioned electrically relative to each other and relative to said electrical connections that the dielectric material of the sections is operated at different gradients differing progressively substantially like and in the same order as said progressively larger heat-dissipating surfaces.

11. In condenser construction, in combination, a plurality of condenser sections each comprising plate members alternated with dielectric material, said sections being connected in series, certain of said sections having a larger heat-dissipating surface than others and the electrostatic capacity of said sections being substantially the same throughout, the thickness of the dielectric material being smaller for sections of larger heat-dissipating surface than for sections of smaller heat-dissipating surface.

12. In condenser construction, in combination, a plurality of condenser sections each comprising plate members alternated with dielectric material, said sections being connected in series, certain of said sections having a larger heat-dissipating surface than others and the thickness of dielectric material being substantially the same throughout, said sections being so proportioned that the voltage applied thereto causes the operating gradient of the dielectric material of the sections of larger heat-dissipating surface to be higher than the operating gradient of the dielectric material of sections of smaller heat-dissipating surface.

13. A condenser made up of a plurality of electrically connected sections each made up of plate members and dielectric material alternated, the dielectric material employed per k. v. a. in said sections being determined substantially by its dielectric strength alone and said sections having heat dissipating surfaces larger than would be necessary if heat losses in the dielectric material, at the frequency of operation of the condenser, were considered a factor in determining the volume of the dielectric material employed.

BROR G. OLVING.